United States Patent [19]

Ohta et al.

[11] Patent Number: 4,893,904
[45] Date of Patent: Jan. 16, 1990

[54] LIQUID CRYSTAL LIGHT SHUTTER

[75] Inventors: Morio Ohta; Hideaki Inoue, both of Tokyo, Japan

[73] Assignees: Casio Computer Co., Ltd.; Casio Electronics Manufac. Co. Ltd., both of Tokyo, Japan

[21] Appl. No.: 220,953

[22] Filed: Jun. 21, 1988

Related U.S. Application Data

[63] Continuation of Ser. No. 814,797, Dec. 30, 1985, abandoned.

[30] Foreign Application Priority Data

Feb. 22, 1985 [JP]  Japan ................................ 60-34135

[51] Int. Cl.$^4$ ............................................. G02F 1/133
[52] U.S. Cl. ...................................... 350/337; 350/349
[58] Field of Search .......................... 350/349, 337, 346

[56] References Cited

U.S. PATENT DOCUMENTS

| | | | |
|---|---|---|---|
| 3,857,628 | 12/1974 | Strong | 350/337 |
| 4,386,836 | 6/1983 | Aoki et al. | 350/346 |
| 4,527,864 | 7/1985 | Dir | 350/349 X |
| 4,613,209 | 9/1986 | Goodby et al. | 350/350 S X |
| 4,614,954 | 9/1986 | Ohta et al. | |
| 4,641,156 | 2/1987 | Ohta et al. | 350/346 |
| 4,647,156 | 3/1987 | Fujimura et al. | 350/339 R |
| 4,745,433 | 5/1988 | Fujimura et al. | 350/331 R |

FOREIGN PATENT DOCUMENTS

58-176620  10/1983  Japan .

Primary Examiner—Stanley D. Miller
Assistant Examiner—Anita Pellman Gross
Attorney, Agent, or Firm—Sandler & Greenblum

[57] ABSTRACT

An arrangement of the liquid crystal light shutter wherein its liquid crystal matter is two-frequency-driven by signals (or waveforms) in which frequencies ($f_H$ and $f_L$) higher and lower than a frequency ($f_C$), which inverts the dielectric aniostropy of the liquid crystal matter, is contained. The liquid crystal matter of this liquid crystal light shutter includes a dichroic dye, and serves to pass or absorb the light entering into the liquid crystal light shutter. This causes the liquid crystal light shutter to be opened or closed, and the liquid crystal light shutter is provided with a polarizing plate for polarizing the light passing through, or entering into this liquid crystal light shutter. The present invention relates to a second polarizing plate employed by the liquid crystal light shutter, for polarizing the light exiting the shutter.

2 Claims, 6 Drawing Sheets

Fig. 9B

LIQUID CRYSTAL LIGHT SHUTTER

This application is a continuation of application Ser. No. 814,797, filed Dec. 30, 1985, now abandoned.

BACKGROUND OF THE INVENTION

1. Field of the Invention

The present invention relates to a liquid crystal light shutter capable of controlling the transmission of light, and, more particularly, it relates to a liquid crystal light shutter suitable for a recording device in which light writing is applied to the photosensitive drum.

2. Prior Art

A printer which employs the electrophotographic technique to achieve high speed printing has been developed and is used these days instead of the impact printers of the mechanical printing type. Laser beam, LED array, liquid crystal light shutter and the like have been proposed as the light writing means relative to the photosensitive matter. In the case of the printer which employs the liquid crystal light shutter, no mechanically-working section is needed to achieve the light writing, the printer can be produced as a solid-state device, and a desired light source which meets the sensitive wavelength of the photosensitive matter can be used.

Since this liquid crystal light shutter is needed to have a high speed response at the time of opening and closing its shutters, the so-called two-frequency frequency drive is employed as the method of driving the liquid crystal.

In the case of driving the liquid crystal light shutter according to the two-frequency drive, an electric field which includes a frequency component (which will be hereinafter referred to as $f_H$) higher than a crossover frequency (at which the dielectric anisotropy of liquid crystal matter is inverted and which will be hereinafter referred to as $f_C$) is applied to achieve dielectric dispersion and sourcefully provides homogeneous alignment when the liquid crystal light shutter which will be described later is turned off, while an electric field which includes a frequency component (which will be hereinafter referred to as $f_L$) lower than $f_C$ is applied to force the direction of the electric field to homeotropic alignment when the liquid crystal light shutter which will be described later is turned on.

Optical characteristics of the liquid crystal light shutter of the Guest-Host type in which a dichroic dye is contained, will be described referring to Figs. 1A, 1B and FIGS. 3A, 3B.

Figure 1A:
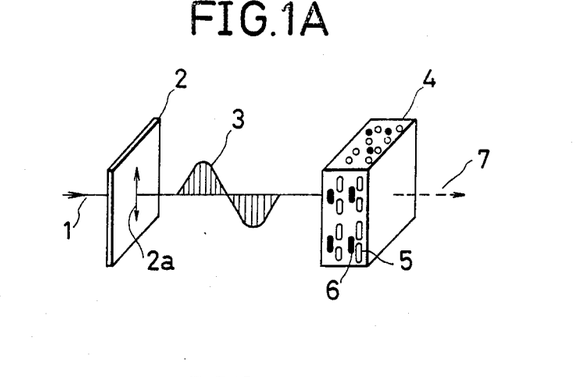
FIGS. 1A and 1B show the main portion of the conventional liquid crystal light shutter.
Figure 1B:
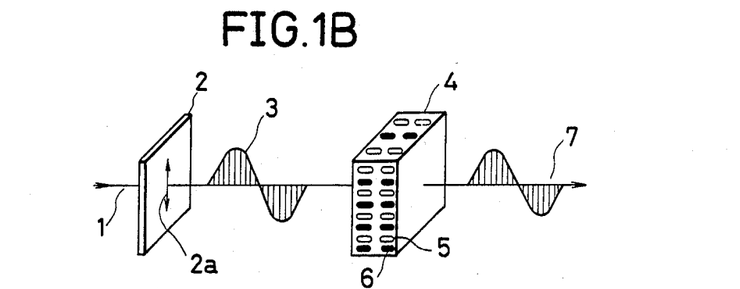

FIGS. 1A and 1B show a liquid crystal cell of the Guest-Host type (which will be hereinafter referred to as G.H type). The liquid crystal cell of the G.H type comprises solving the dichroic dye which serves as the Guest, into the liquid crystal which serves as the Host. Incident light 1, coming from a light source which has the same wavelength as the absorption wavelength of the dichroic dye, is linearly-polarized by a polarizing plate 2, which has a polarizing direction 2a, to become light 3, which enters into a liquid crystal cell 4. The liquid crystal cell 4 comprises liquid crystal molecules 5 and dichroic dye molecules 6, whose alignment directions are made changeable by the applied frequency $f_L$ or $f_H$. Since the dichroic dye molecules 6 absorb more light in the direction of their long axis than in the direction of their short axis, the linearly-polarized light 3, which has entered into the liquid crystal cell 4 is absorbed, emitting no light 7 outside, in the case where the liquid crystal molecules 5 and dichroic dye molecules 6 are aligned as shown in FIG. 1A. Therefore, it is in a closed state when it is used as the liquid crystal light shutter.

When the liquid crystal molecules 5 and dichroic dye molecules 6 are so aligned, as shown in FIG. 1B, so as not to absorb the incident light 3, the light 7 is emitted outside. It is in the open state when it is used as the liquid crystal light shutter.

Figure 3A:
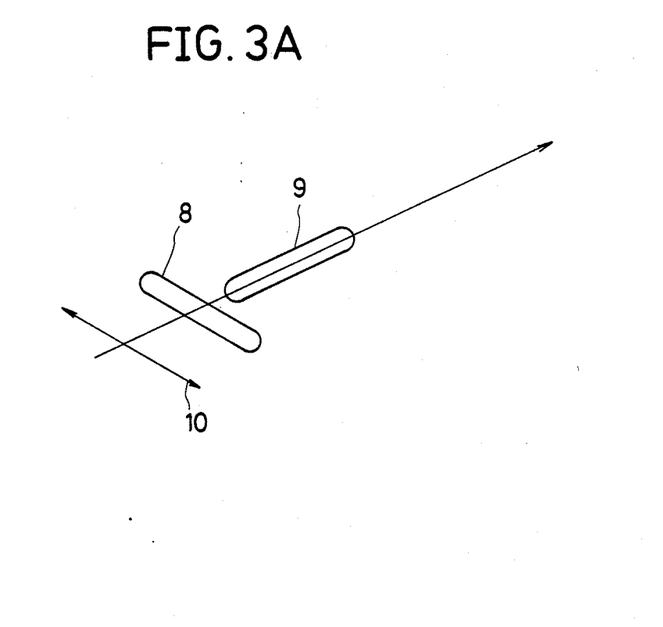
FIGS. 3A and 3B show the action of dichroic dye molecules.
Figure 3B:
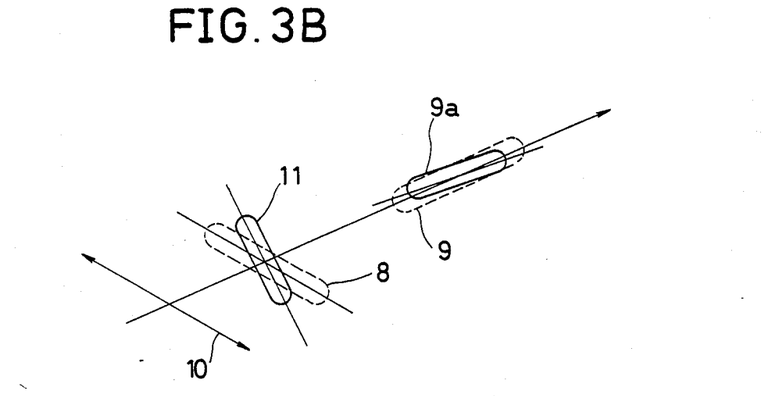
Figure 4:
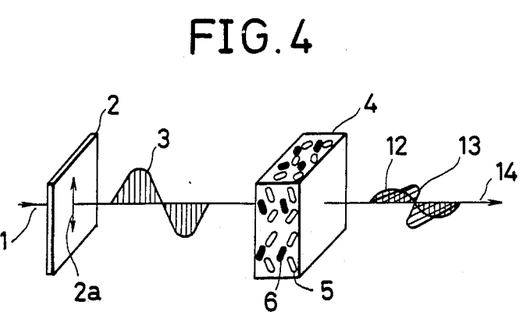
FIG. 4 shows the main portion of the conventional liquid crystal light shutter.

In order to expect a high speed response, however, the above-described liquid crystal light shutter is used while it is kept in a heated state and as it is reduced in viscosity. In addition, it is driven by a drive waveform in which many high frequency components of high voltage are contained, as represented by 31 in FIG. 7A, for example, at the time of its off-drive. The liquid crystal molecules 5 are not completely aligned parallel to the aligning-treatment direction of the liquid crystal cell 4 under these circumstances. Therefore, the dichroic dye molecules 6, also cause a shift 11, as shown in FIG. 3B, relative to the regular aligning direction 8 which is parallel to the aligning-treatment direction shown in FIG. 3A. Because of this shift 11, the linearlypolarized light is not completely absorbed by the dichroic dye molecules 6, thereby emitting a very small amount of leaked light outside. Numeral 10 in FIGS. 3A and 3B denotes the polarized direction of light 3, which has been linearly-polarized by the polarizing plate 2. As shown in FIG. 4, the polarized direction of light, which has been double-refracted inside the liquid crystal cell 4, is different from its originally-polarized direction because of the anisotropy of the refracting rate of the irregularly-oriented liquid crystal molecules 5. Therefore, a shift between the dichroic dye molecules and the polarized direction of double-refracted light becomes more remarkable, so that a composite consisting of leaked light components 12 and double-refracted, but not-absorbed components 13 becomes emitted light 14, thereby making the off-state of the above-described shutter incomplete.

When the liquid crystal light shutter repeats its on-off operation, this phenomenon is different between single off-operation and continuous off-operations. In short, the amount of light emitted is larger at the time of continuous off-operations than at the time of single off-operation, and its level becomes different depending upon temperature.

SUMMARY OF THE INVENTION

The present invention is therefore intended to eliminate the above-mentioned drawbacks and the object of the present invention is to provide a liquid crystal light shutter of the Guest-Host type which can control any increase in the amount of light transmitted under shutter off-state, said increase resulting from the alignment shift at the time of shutter drive, and which can make uniform the amount of light transmitted under shutter off-state.

This object of the present invention can be achieved by a liquid crystal light shutter of the Guest-Host type, which includes a mixture of liquid crystal matter and dichroic dye sealed between two substantially transparent plates, and which is optically opened and closed responsive to drive electric fields, which correspond to information to be recorded, to selectively pass the light of a light source therethrough so as to irradiate light information onto a photosensitive body, wherein the liquid crystal light shutter is provided with polarizing plates on its light-entering and -emerging sides.

DETAILED DESCRIPTION OF THE INVENTION

An embodiment of the present invention will be described with reference to the accompanying drawings.

Figure 5:
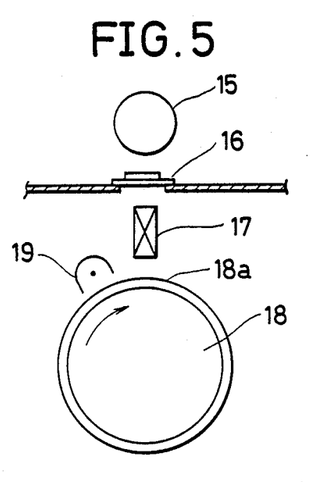
FIG. 5 shows an arrangement of the recording device which employs the liquid crystal light shutter of the present invention.
Figure 6:
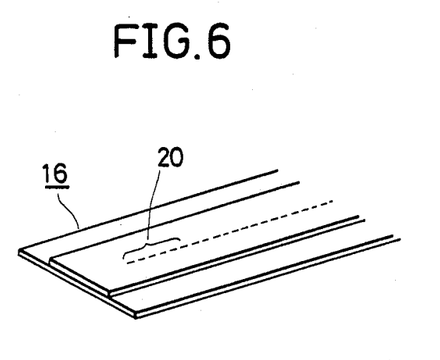
FIG. 6 shows an arrangement of the liquid crystal light shutter according to the present invention.

FIG. 5 is a sketch showing an arrangement of the recording device which employs a liquid crystal light shutter of the present invention. In FIG. 5, numeral 15 represents a light source, 16 a liquid crystal light shutter of the present invention, 17 an imaging lens, 18 a photosensitive drum, and 19 a charger. The liquid crystal light shutter 16 has a plurality of microshutters 20 therein, as shown in FIG. 6. Although not shown, a heater for heating the liquid crystal light shutter 16 to a predetermined temperature which will be described later, is housed in the liquid crystal light shutter 16. To briefly describe the recording operation of the recording device, light emitted from the light source 15 enters into the microshutters 20 in the liquid crystal light shutter 16. The microshutters 20 are driven by a control circuit (not shown) to selectively open and close according to the above-mentioned two-frequency drive, and light passed through the opened microshutters 20 is imaged onto a photosensitive face 18a of the photosensitive drum 18 through the imaging lens 17, to expose an image equal in size to those microshutters 20, through which the light has been passed.

The photosensitive face 18a is exposed responsive to signals to be recorded, and the charge, which has been previously and uniformly applied to the photosensitive drum 18 by means of the charger 19, vanishes according to the amount of exposure, to form a static latent image. This latent image is treated by the same process as the copying process of the usual electronic copying machines and the like.

Figure 2:
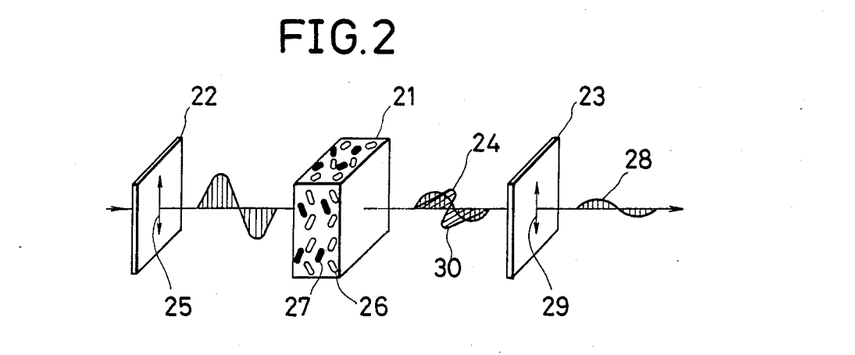
FIG. 2 shows an arrangement of the main portion of a liquid crystal light shutter according to the present invention.

The arrangement of one microshutter 20 in the liquid crystal light shutter 16, which passes and shields light during the above-mentioned recording operation, is as shown in FIG. 2, wherein polarizing plates 22 and 23 are located at the front and back of a liquid crystal cell 21 respectively, and wherein, the polarizing directions of both these polarizing plates are parallel to the aligning-treatment direction of the liquid crystal cell 21. This arrangement is intended to prevent those components, which are caused by double refraction at the time when the abovedescribed conventional liquid crystal light shutter is under off-state, from being leaked. Namely, the polarizing plate 23 is also located on the light-emerging side of the liquid crystal cell 21.

In order to confirm the state of a component 24, which is caused by double refraction through the liquid crystal cell 21 shown in FIG. 2, a description will be made locating the polarizing plate 23 on the light-emerging side of the liquid crystal cell 21, in such a way that the polarizing direction of the polarizing plate 23 becomes perpendicular to the polarizing direction 25 of the polarizing plate 22, for example.

Figure 7A:
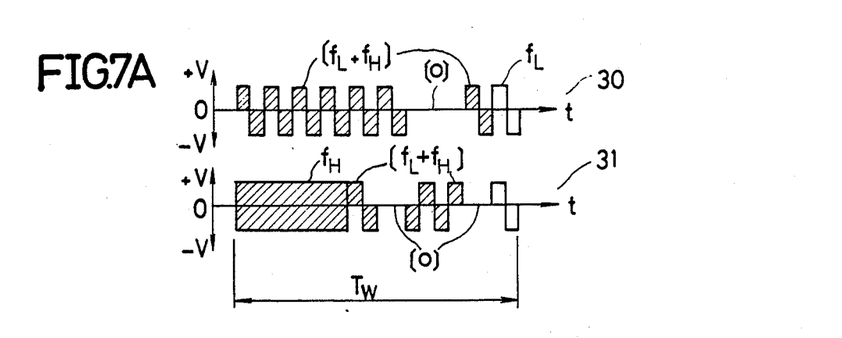
FIG. 7A shows signals for two-frequency drive.
Figure 8:
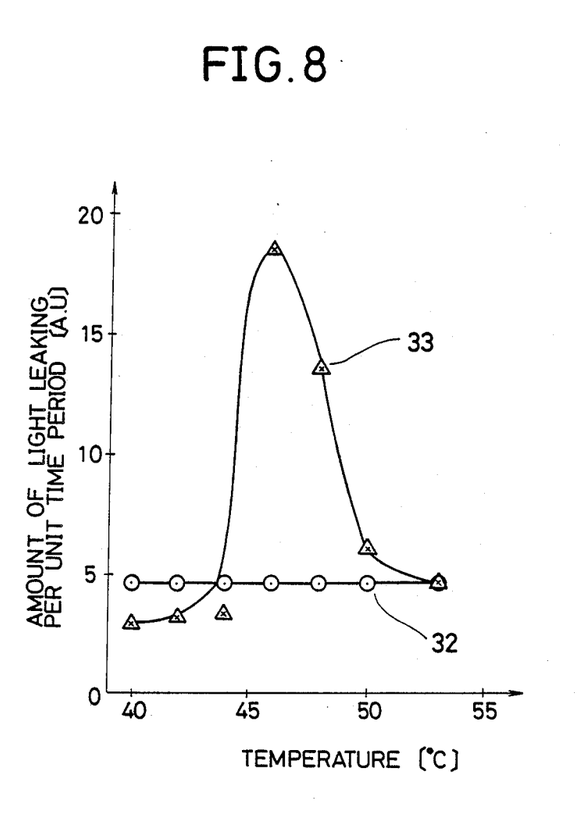
FIG. 8 is a characteristic view showing the amounts of light leaked through a liquid crystal cell.

Temperature characteristics of the amount of light emerged during one cycle $T_W$ when on- and off-drive signals 30 and 31 are applied according to the two-frequency drive, as shown in FIG. 7A, are represented by numerals 32 and 33 in FIG. 8.

If light is not double-refracted through the liquid crystal cell 21, the amount of light emerged when the polarizing plate 23 is located perpendicular to the polarizing plate 22 does not depend upon the state of liquid crystal molecules 26 or dichroic dye molecules 27, but equals the orthogonal light transmission ratio of the polarizing plates 22 and 23. This value changes depending upon the polarizing plate, but it is in the order of several percentages.

As shown in FIG. 8, however, a temperature range over which the amount 33 of light emerged at the time of off-drive, rises abnormally higher than the amount 32 of light emerged at the time on-drive exists. This temperature range is from 44° C. to 53° C. as shown in FIG. 8, for example. In addition, the peak value is over 15% of the amount of light emerged at the time of on-drive which is shown in FIG. 1B, and it can be understood how large the component 13, which is caused by double refraction in FIG. 4, is. Further, this temperature range corresponds substantially to the one to which the liquid crystal matter is heated by the heater (not shown) to respond at high speed, and this temperature range cannot be avoided to use the liquid crystal matter as the shutter.

That change in the amount of light passed, which is caused by the dichroic dye molecules shifted from their regular aligning direction when the liquid crystal molecules are shifted from the regular aligning direction in the homeotropic alignment, as shown in FIG. 3B, is stable and small relative to temperature, as shown by the numeral 32 in FIG. 8. It is substantially the same as when no shift is caused, as shown in FIG. 1A, and it causes no problem.

According to the present invention, therefore, the polarizing plate 23, which has the polarizing direction 29 parallel to that of the polarizing plate 22 located on the light-entering side, is located on the light-emerging side to absorb the component 24 which is caused by the above-mentioned double refraction. The component 24, which is caused by this double refraction, is absorbed by the polarizing plate 23, thereby reducing the emerged light 28 to a very small amount of leaked light.

Although another operation model at the time when the liquid crystal light shutter 16 is turned on is not shown, the emerged light is attenuated only by the parallel light transmission ratio of another polarizing plate (not shown), which has the polarizing direction parallel to the vibrating direction by means of this polarizing plate. This parallel light transmission ratio is substantially 85%, a value adequate enough to be practically used.

Figures 7B, 7C:
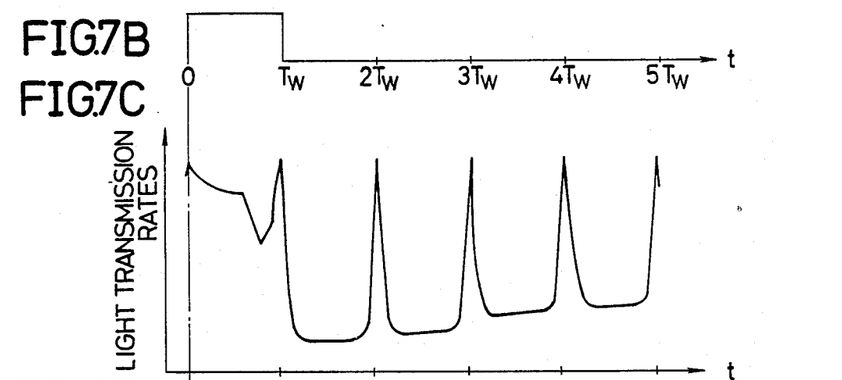
FIGS. 7B through 7D are characteristic views showing light transmission rates.
Figure 7D:
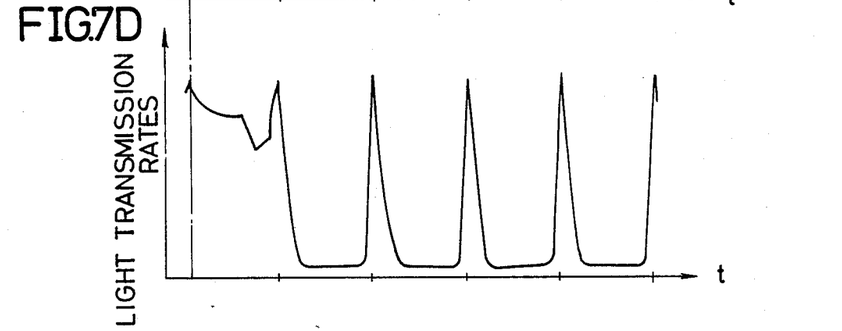

FIGS. 7B through 7D show electrooptic response characteristics obtained by the liquid crystal light shutter 16 of the present invention as well as by the conventional one.

FIG. 7B shows four off-drives of the liquid crystal light shutter which are continuous from the on-drive thereof. FIGS. 7C and 7D show electrooptic responses achieved by the conventional liquid crystal light shutter and by the one 16 of the present invention respectively.

The light transmission ratio at the time of off-drive is unstable in its level relative to temperature in the case of the conventional liquid crystal light shutter, while the light transmission ratio at the time of off-drive becomes very stable in its level, and on/off ratio can be enhanced by about 15%, as compared with the conventional one, because the amount of light emerged at the shutter-off time is reduced, in the case of the liquid crystal light shutter of the present invention.

Figure 9A:
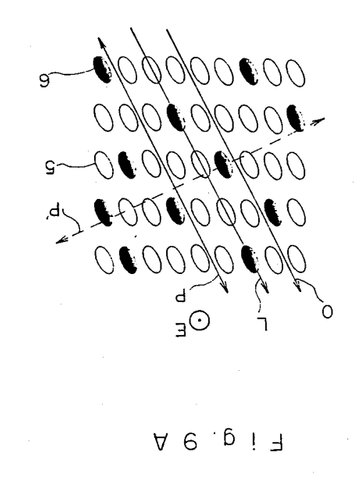
FIGS. 9A and 9B show the alignment of ferroelectric liquid crystal molecules.
Figure 9B:
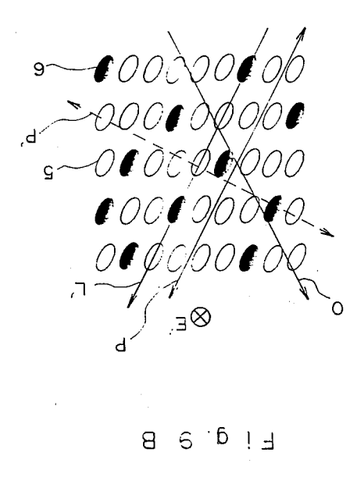

Although the liquid crystal whose dielectric anisotropy changes depending upon the frequency of drive voltage has been employed as the Host liquid crystal in the case of the above embodiments, other chiral smectic liquid crystals such as DOBANBC (pdecyloxybenzylidene-p'-amino-2-methylbuthyl-cinnamate) and HOBANBC (p-hexyloxybenzylidene-p'-amino-2-methylbuthyl-cinnamate), for example, which have ferroelectricity, may be used. As seen in the case of the above embodiments, these ferroelectric liquid crystals are sealed in together with the dichroic dye and arranged in a homogeneous manner between the paired transparent substrates, which are formed by laminating a transparent electrode and an alignment film onto inner faces opposed to each other. The ferroelectric liquid crystal which has been arranged in a homogeneous manner, changes its homogeneous alignment depending upon the direction of the electric field applied through the transparent electrode. The longitudinal axes of liquid crystal molecules 5 are directed along the aligning treatment direction 0 in which the alignment film has been oriented, as shown in FIG. 9A, depending upon the direction of an electric field E, while they are shifted by several tens of degrees from the alignment treatment direction 0, as shown in FIG. 9B, when an electric field E', whose direction is reverse to that of the electric field E is applied. Therefore, the polarizing plates can be arranged in four ways in the case of the above embodiment. One way is to bring the polarizing direction of two polarizing plates under coincidence with a direction L in which the liquid crystal molecules are aligned when the electric field E is applied, or the aligning treatment direction 0, as shown by a solid line P in FIG. 9A. In this case, the condition under which the electric field E is applied represents off-state, while the condition under which the electric field E' is applied represents onstate. A second way is to make the polarizing direction of two polarizing plates perpendicular to the aligning treatment direction 0, as shown by a broken line P' in FIG. 9A. In this case, the condition under which the electric field E is applied represents on-state, while the condition under which the electric field E' is applied represents off-state. A third way is to make the polarizing direction of two polarizing plates coincide with the direction L' in which the liquid crystal molecules are oriented when the electric field E' is applied, as shown by a solid line P in FIG. 9B. In this case, the condition under which the electric field E is applied represents on-state, while the condition under which the electric field E' is applied represents off-state. A fourth way is to make the polarizing direction of two polarizing plates perpendicular to the direction L', as shown by a broken line P' in FIG. 9B. In this case, the condition under which the electric field E is applied represents off-state, while the condition under which the electric field E' is applied represents on-state.

Although an alignment shift is caused between the liquid crystal molecules 5 and the dye molecules 6 in the case of this liquid crystal light shutter when it is alternately and continuously turned on and off, any increase in the amount of light transmitted which results from the alignment shift can be controlled by the polarizing plate located on the side of light emission, as seen in the case of the above embodiments.

Considering the characteristics of the whole, the polarizing plate, which is located on light-emerging side, is selected to have a somewhat low polarizing capacity but a high light transmission ratio. Reduction in the amount of light at the time of on-drive of the liquid crystal light shutter can be thus compensated, and thinner polarizing plates, and those which have the effect of cutting ultraviolet rays may be employed. The polarizing plate, which is located on the light-entering side, may be slanted to have an adequate angle, if necessary.

According to the present invention as described above in detail, any increase in the amount of light transmitted under shutter off-state which results from the alignment shift between the liquid crystal moledules and the dye molecules at the time of shutter drive can be controlled, and this amount of transmitted light can thus be made uniform by the polarizing plate located on the light emission side of liquid crystal cells, so that the quality of images recorded can be made stable. Particularly with the liquid crystal light shutter, wherein the liquid crystal whose dielectric anisotropy changes depending upon the frequency of electric field applied, is employed as the Host liquid crystal, accumulated increase in the amount of light transmitted under continuous off-state of the microshutters can be eliminated and the characteristic of stably repeating off-operation can be attained, with the amount of light transmitted being held the same between the one-time off-operation state and the continuous off-operations. In addition, the on/off ratio in the amount of light transmitted can be enhanced by about 15%. Therefore, fine lines of recorded images can be made clear to enhance the quality of the images recorded.

What is claimed is:

1. A liquid crystal light shutter of the Guest-Host type in combination with and interposed between a light source and a photosensitive body, said shutter comprising:
   (a) two substantially transparent plates, each of which has an electrode;
   (b) a first polarizing plate located between one of said transparent plates and said light source;
   (c) a mixture of a liquid crystal material and a dichroic dye sealed between said two transparent plates, said liquid crystal material behaving as a host, and said dye behaving as a guest, and being wholly responsive to the application of a high frequency signal to said electrodes for effecting homogeneous alignment substantially parallel to the direction of polarization of said first polarizing plate according to the direction of orientation processing of said two plates to prevent transmission of light through the shutter, and being wholly responsive to the application of a low frequency signal to said electrodes for effecting homeotropic alignment substantially perpendicular to said direction of polarization to effect transmission of light through said shutter;

(d) means for applying to said electrodes a signal composed of said high frequency signal and/or said low frequency signal corresponding to recorded information for effecting control of the transmission of light from said source to said photosensitive body only through the absorption of light by said dichroic dye;

(e) means for heating said liquid crystal material for raising its temperature to and holding its temperature at a predetermined level enabling high speed operation of the shutter; and (f) a second polarizing plate located between the other of said plates and said photosensitive body, and having a direction of polarization substantially parallel to that of said first polarizing plate for the purpose of interrupting light which is transmitted through said mixture and is not absorbed by said dichroic dye due to a misalignment of said homogenous orientation of said liquid crystal material and said dichroic dye for improving the contrast capabilities of said liquid crystal shutter, the last mentioned light transmitted through said mixture being caused by a greater shift in homogeneous orientation at said predetermined level of temperature.

2. A liquid crystal light shutter according to claim 1 wherein said predetermined level of temperature ranges from 44° C. to 53° C.

* * * * *

UNITED STATES PATENT AND TRADEMARK OFFICE
CERTIFICATE OF CORRECTION

PATENT NO. : 4,893,904

DATED : January 16, 1990

INVENTOR(S) : Morio OHTA et al.

It is certified that error appears in the above-identified patent and that said Letters Patent is hereby corrected as shown below:

Title page, [57] ABSTRACT, line 5, change "aniostropy" to ---anisotropy---.
Column 1, line 29, delete "frequency" (second occurrence).
Column 2, line 23, change "linearly polarized" to ---linearly-polarized---.

Column 5, line 25, change "pdecyloxybenzyli-" to ---p-decyloxybenzyli----.

Signed and Sealed this

Ninth Day of June, 1992

Attest:

DOUGLAS B. COMER

Attesting Officer

Acting Commissioner of Patents and Trademarks